United States Patent
Quinlan et al.

[15] 3,696,497
[45] Oct. 10, 1972

[54] METHOD OF MAKING A BACKING STRIP FOR A WIPER BLADE

[72] Inventors: William J. Quinlan; Lawrence L. Huver, both of Hastings, Mich.

[73] Assignee: Hastings Manufacturing Company, Hastings, Mich.

[22] Filed: Nov. 19, 1970

[21] Appl. No.: 90,938

Related U.S. Application Data

[63] Continuation-in-part of Ser. No. 883,928, Dec. 10, 1969, Pat. No. 3,616,485, which is a continuation-in-part of Ser. No. 725,325, April 30, 1968, Pat. No. 3,541,629.

[52] U.S. Cl. ..................29/407, 29/451, 15/250.42
[51] Int. Cl. ........................B23q 17/00, B23p 11/02
[58] Field of Search ........15/250.36, 250.42; 29/428, 29/451, 407, 453, 235, 515, 509

[56] References Cited

UNITED STATES PATENTS 2,687,544 8/1954 Scinta.....................15/250.42
2,924,839 2/1960 Anderson..............15/250.42
3,041,653 7/1962 Krohm...................15/250.42
3,141,186 7/1964 Scinta....................15/250.42
3,393,419 7/1968 Scinta....................15/250.42

FOREIGN PATENTS OR APPLICATIONS 803,354 10/1958 Great Britain..........15/250.36

Primary Examiner—P. Feldman
Attorney—Munson H. Lane and Munson H. Lane, Jr.

[57] ABSTRACT

A flexible wiper element supported by a resiliently flexible backing strip. In some embodiments the wiper element and backing strip are bonded together. In other embodiments the backing strip includes a pair of transversely spaced strip members which retain the wiper element therebetween. Longitudinal edge portions of the backing strip are embraced by the usual claws of a wiper pressure unit, and longitudinally spaced detents are provided on the backing strip to releasably or snap-fittingly receive one of the claws between them, whereby to releasably hold the blade unit and pressure unit in assembled relation.

5 Claims, 44 Drawing Figures

PATENTED OCT 10 1972 3,696,497
SHEET 1 OF 6
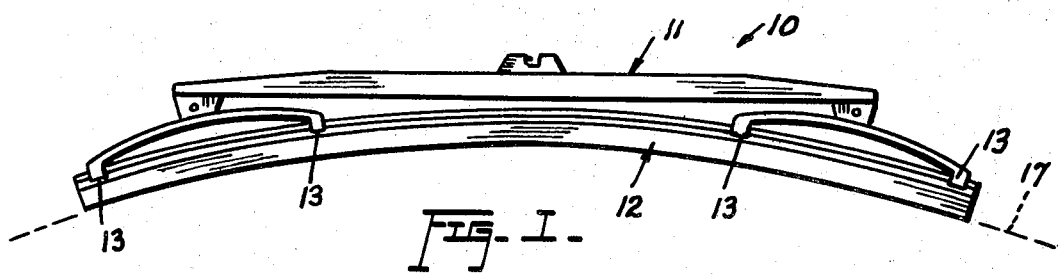
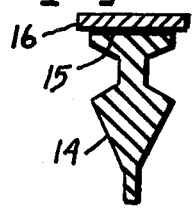 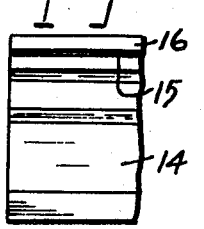 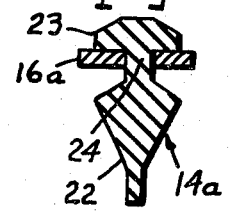 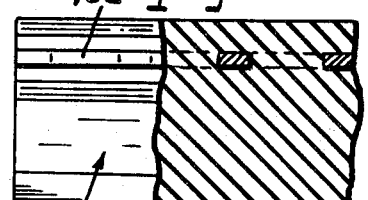
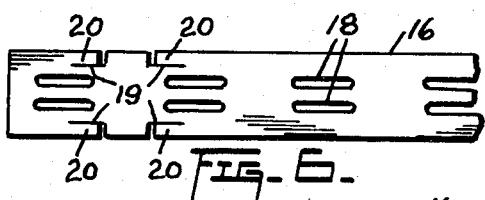
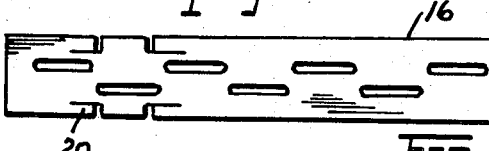
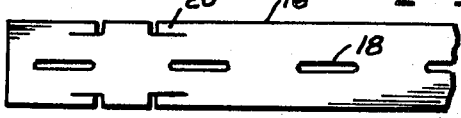 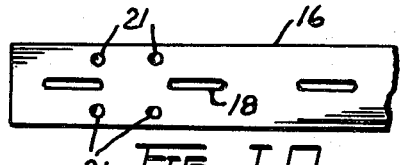
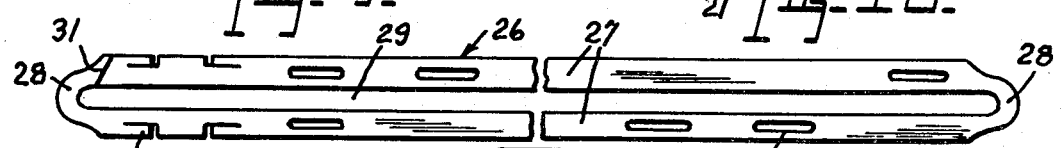
INVENTORS
William J. Quinlan
Lawrence L. Huver
BY Munson H. Lane
ATTORNEY

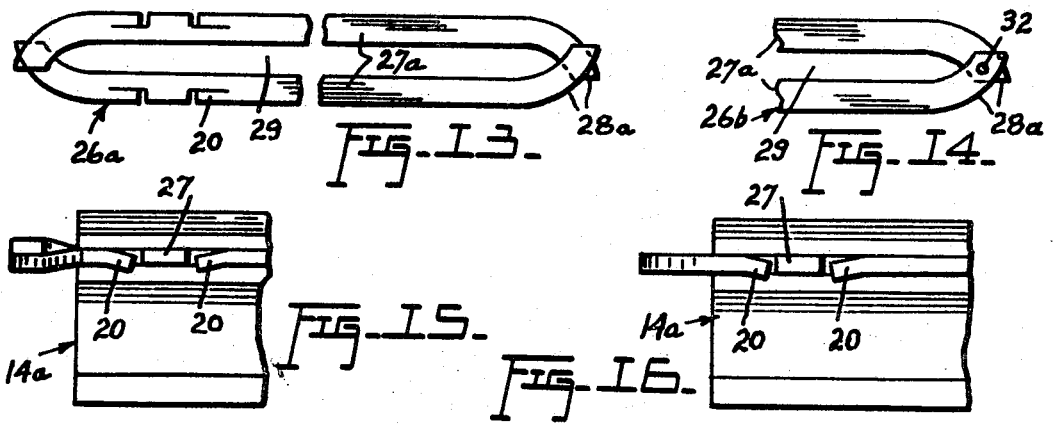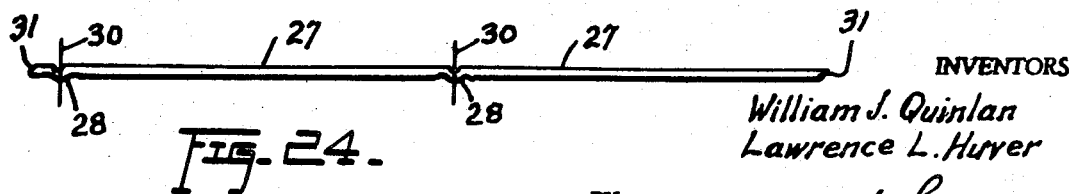

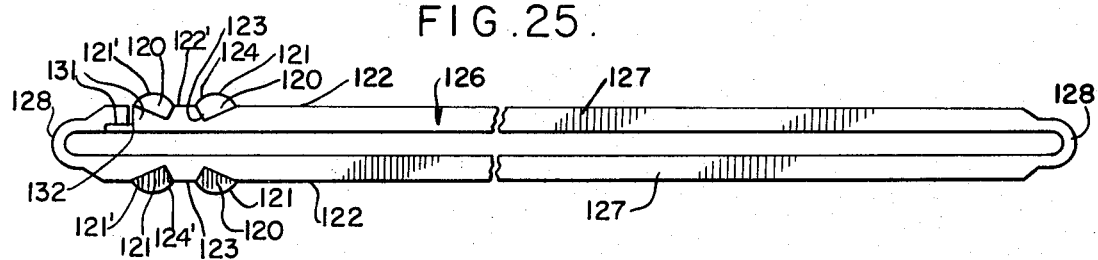
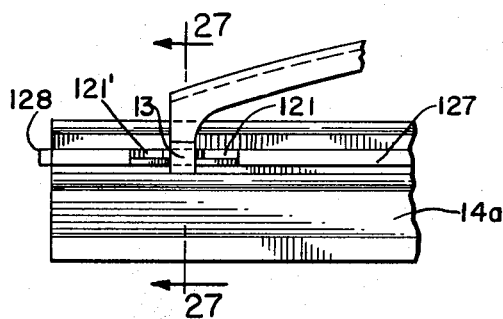
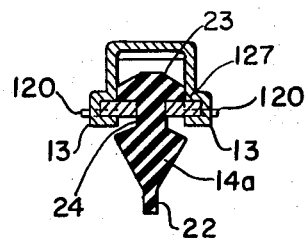
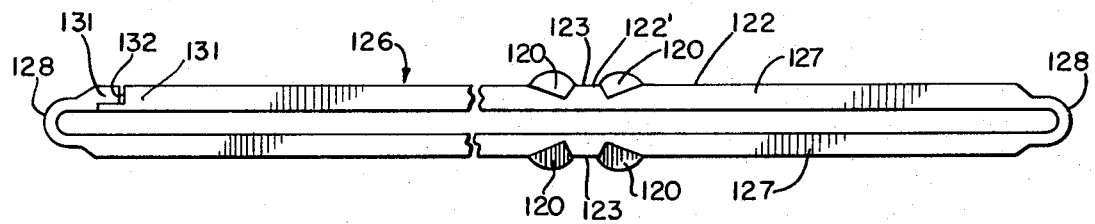
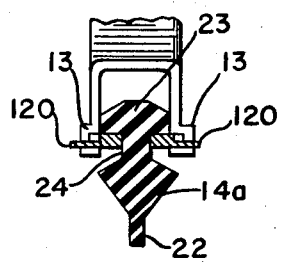
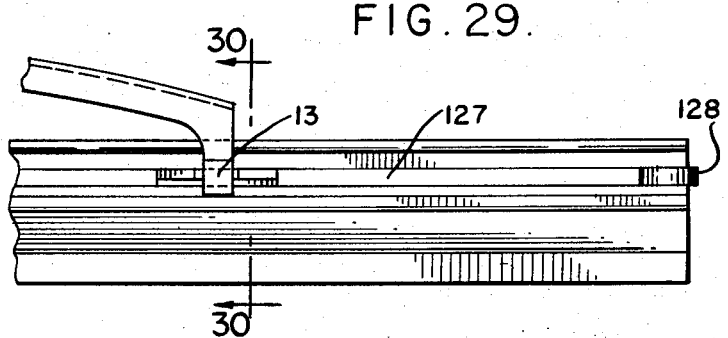
INVENTORS
William J. Quinlan &
Lawrence L. Huver

INVENTOR
WILLIAM J. QUINLAN &
LAWRENCE L. HUVER

BY Munson H. Lane

ATTORNEY

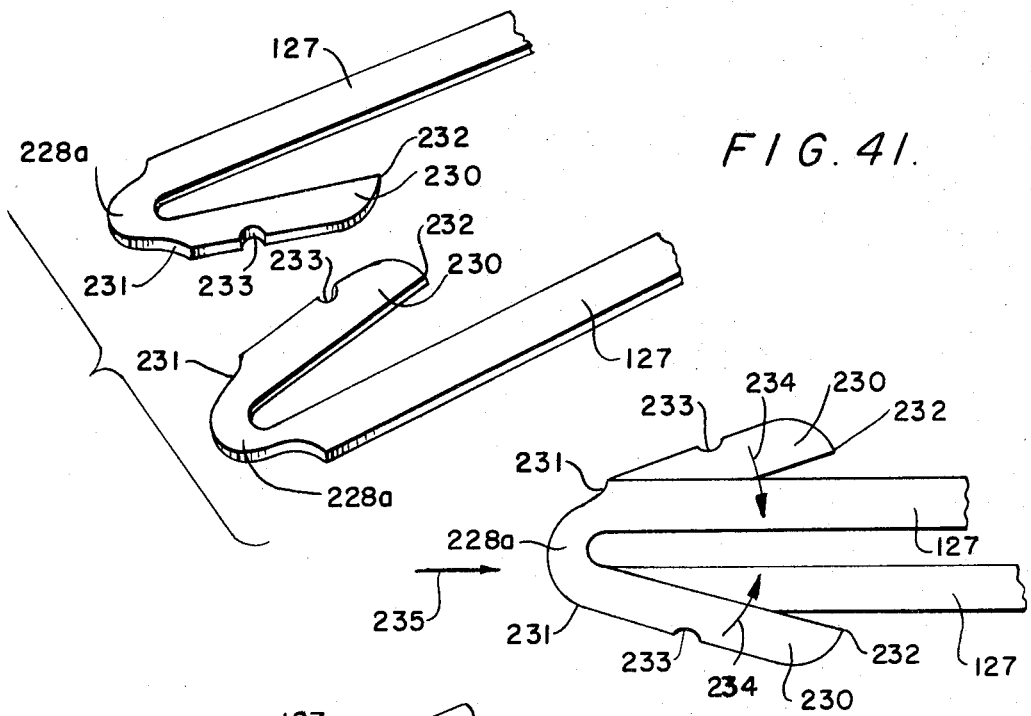
FIG. 41.
FIG. 42.
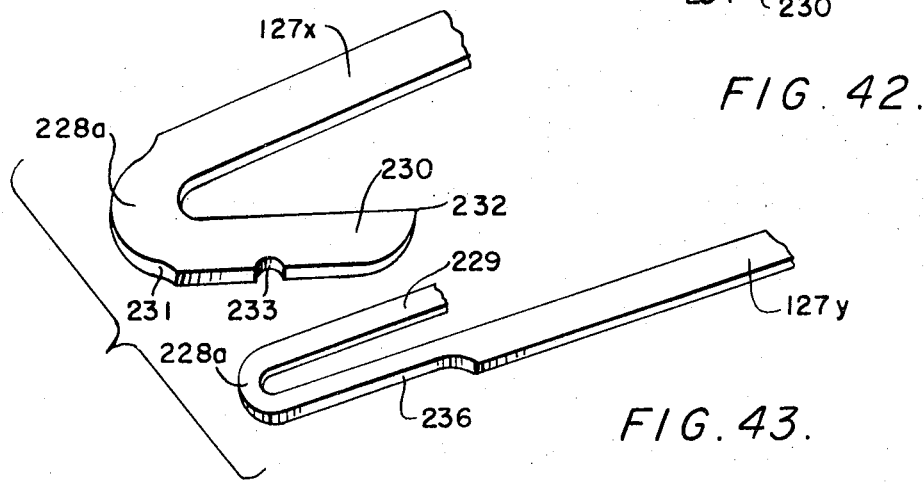
FIG. 43.
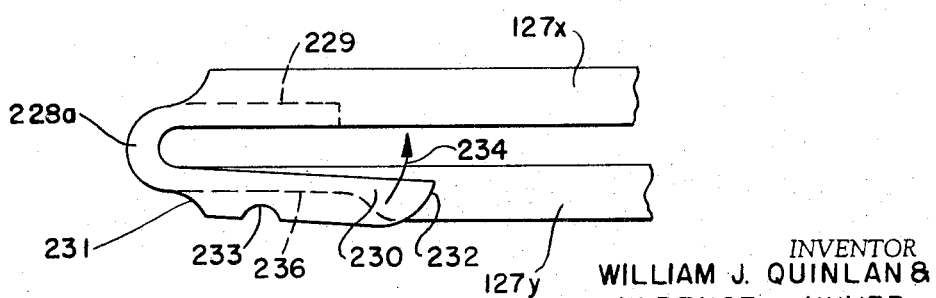
FIG. 44.
INVENTOR
WILLIAM J. QUINLAN &
LAWRENCE L. HUVER
BY Munson H. Lane
ATTORNEY

METHOD OF MAKING A BACKING STRIP FOR A WIPER BLADE

This application is a continuation-in-part of our allowed application Ser. No. 883,928, filed Dec. 10, 1969 now U.S. Pat. No. 3,616,485, granted Nov. 2, 1971, which in turn is a continuation-in-part of our application Ser. No. 725,325, filed Apr. 30, 1968 now U.S. Pat. No. 3,541,629, granted Nov. 24, 1970.

The invention relates to new and useful improvements in windshield wiper blade assemblies of the flexible type such as may be used on either flat or curved windshields, and in particular the invention concerns itself with certain improvements in blade assemblies utilizing a pressure unit with a detachable blade unit.

An object of the invention is to provide a detachable blade unit which may be quickly and easily applied to or removed from the pressure unit and which is dependably held in assembled relation with the pressure unit without the use of separate parts such as clips, springs, screws, or the like, so that there is no possibility of such separate parts becoming lost while the blade unit is being replaced.

Another important object of the invention is to provide an improved blade unit consisting of a flexible wiper element supported by a resiliently flexible backing strip in such manner that the action of the pressure unit on the backing strip assures a proper wiping contact of the full length of the wiper element with either a flat or a curved windshield.

Another object of the invention is to provide the blade unit with a blade backing strip of novel construction which may be easily and economically manufactured and readily assembled with the wiper element.

U.S. Pat. No. 3,541,629 discloses a flexible wiper element supported by a resiliently flexible backing strip. In some embodiments the wiper element and backing strip are bonded together. In other embodiments the backing strip includes a pair of transversely spaced strip members which retain the wiper element therebetween. Longitudinal edge portions of the backing strip are embraced by the usual claws of a wiper pressure unit, and longitudinally spaced detents are provided on the backing strip to releasably or snap-fittingly receive one of the claws between them, whereby to releasably hold the blade unit and pressure unit in assembled relation.

U.S. Pat. No. 3,541,629 relates particularly to the blade backing strip which is provided with claw locking means comprising a pair of longitudinally spaced detents including inclined portions to facilitate entry of a claw of the pressure unit in either direction into the space between the detents, whereby the pressure unit is releasably locked in position. Preferably means are also provided to permit or facilitate removal of the claw from the locked position in either direction. In some cases spring detents are employed which may be depressed to permit removal of the claw; in other cases cam means are provided to facilitate such removal.

This application presents additional embodiments of the claw locking means on the blade backing strip, and also introduces a novel formation of the ends of the backing strip to provide stop means for a wiper element when assembled thereon.

With the foregoing objects and features in view and such other objects and features as may become apparent as this specification proceeds, the invention will be understood from the following description taken in conjunction with the accompanying drawings, wherein like characters of reference are used to designate like parts, and wherein:

FIG. 1 is a side elevational view of a blade assembly including a pressure unit and a blade unit;

FIG. 2 is an enlarged cross-sectional view of one embodiment of the blade unit;

FIG. 3 is a fragmentary side elevational view of the blade unit shown in FIG. 2;

FIG. 4 is a cross-sectional view of another embodiment of the blade unit;

FIG. 5 is a fragmentary view, partly in side elevation and partly in longitudinal section of the blade unit of FIG. 4;

FIG. 6 is a fragmentary plan view of the backing strip used in the blade unit of FIG. 2;

FIG. 7 is a fragmentary plan view of the backing strip used in the blade unit of FIG. 4;

FIG. 8 is a fragmentary plan view of another embodiment of the backing strip;

FIG. 9 is a fragmentary plan view of another embodiment:

FIG. 10 is a fragmentary plan view of another embodiment;

FIG. 11 is a plan view showing another modification of the backing strip;

FIG. 12 is a fragmentary plan view of another modification;

FIG. 13 is a plan view of still another modification;

FIG. 14 is a fragmentary plan view of another modification;

FIG. 15 is a fragmentary side elevational view of a blade unit using the backing strip of FIG. 13;

FIG. 16 is a fragmentary side elevational view of a blade unit using the backing strip of FIG. 11;

FIG. 17 is a fragmentary side elevational view showing a claw of the pressure unit applied to a blade unit utilizing spring detents on the backing strip;

FIG. 18 is a cross-sectional view, taken substantially in the plane of the line 18—18 in FIG. 17;

FIG. 19 is a fragmentary sectional view, taken substantially in the plane of the line 19—19 in FIG. 18;

FIG. 20 is a view similar to that in FIG. 19 but showing a modified arrangement of the spring detents;

FIG. 21 is a view similar to that in FIG. 18 but with the blade unit of FIG. 2;

FIG. 22 is a fragmentary side elevational view showing a claw of the pressure unit applied to a blade unit utilizing boss type detents;

FIG. 23 is an enlarged fragmentary sectional detail of one of the boss type detents;

FIG. 24 is a developed plan view of the backing strip of FIGS. 11 or 12, showing the same on a reduced scale and prior to its bending into shape;

FIG. 25 is a plan view similar to FIG. 11 showing a blade backing strip, but provided with pairs of detents in the form of cams located near one end thereof and struck out from the material of the backing strip;

FIG. 26 is a fragmentary side elevation of a blade unit using the backing strip of FIG. 25;

FIG 27 is a cross-section taken substantially in the plane of line 27—27 of FIG. 26;

FIG 28 is a plan view similar to FIG. 25, but with the pairs of cam detents located farther from the ends of the blade than in FIG. 25;

FIG. 29 is a fragmentary side elevation of a blade unit showing the backing strip of FIG. 28;

FIG. 30 is a cross-section taken substantially in the plane of line 30—30 of FIG. 20;

FIG. 41 is a fragmentary group perspective view showing another embodiment of the backing strip in which the strip members are overlapped;

FIG. 42 is a fragmentary plan view of the backing strip members of FIG. 41 in their overlapped relation;

FIG. 43 is a fragmentary group perspective view of another embodiment of the backing strip with overlapped strip members; and FIG. 44 is a fragmentary plan view of the backing strip members of FIG. 43 in their overlapped relation.

Figure 31:
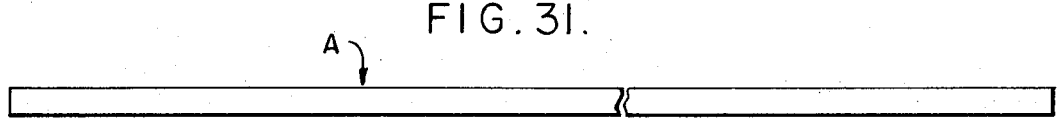
FIGS. 31–35 are diagrammatic views illustrating steps in the formation of the preferred type of backing strips.

Before describing the invention in detail it is to be noted that three basic types of the blade unit are disclosed, each embodying a different structural combination of a wiper element and backing strip. Moreover, different types of longitudinally spaced detents are disclosed for releasably holding a claw of the pressure unit assembled on a backing strip of the blade unit of any one of the three basic types, and several modifications of the backing strip are also disclosed, any one of which may utilize either of the two types of releasable detents. For sake of simplicity of illustration only a few of the possible combinations have been shown in the drawings and it should be understood that various other combinations are also possible.

Referring now to the accompanying drawings in detail, FIG. 1 shows a windshield wiper blade assembly 10 consisting of two basic units, namely, a pressure unit or super structure 11 and a blade unit or flexer assembly 12, the blade unit being detachably connected to the usual claws 13 of the pressure unit so that the blade unit may be easily replaced.

In accordance with this invention means are provided to facilitate assembly or disassembly of the blade or flexer unit as will be more fully set forth hereinafter.

One suitable type of blade or flexer unit which may be employed in accordance with the invention is shown in FIGS. 2, 3, 20 and 21, the same comprising an elongated, flexible wiper element 14 made of rubber, or the like, which may be adhesively bonded as at 15 to a backing strip 16. The backing strip, which may be made of metal, is resiliently flexible in a plane normal to its surfaces, but is substantially rigid against lateral or edgewise deflection. Thus, when the blade unit is applied to the pressure unit 11, the flexibility of the backing strip as stated permits the full length of the wiper element 14 to properly contact the windshield 17, regardless of whether the windshield is flat or has varying degrees of curvature.

The backing strip of flexer 16 may be imperforate, but in order to enhance its flexiblity in a plane normal to its surfaces, the strip may be provided with a longitudinal row of perforations or slots 18 as shown in FIGS. 9 and 10. Alternatively, two or more rows of such perforations may be provided, and the perforations in the two or more rows may be either transversely aligned as shown in FIG. 6 or longitudinally staggered as shown in FIG. 8. Also, if greater flexibility is desired in the end portions of the strip than in the center portion thereof, the perforations may be provided only in the end portions and the center portion may be left imperforate, as shown in the right-hand end of FIG. 8.

It will be understood that various forms of perforations may be employed if desired in connection with any of the types of backing strip or flexer herein disclosed or such perforations may be omitted if desired without departing from the invention in its broadest aspect.

In any event, when the blade unit 12 is assembled to the pressure unit 11, the claws 13 of the pressure unit slidably engage the longitudinal edge portions of the backing strip 16 as will be apparent from FIG. 21, whereby the blade unit is free to flex in passing over the windshield contour while the longitudinal distance or spacing between the claws remains substantially the same. However, to prevent separation of the blade unit from the pressure unit by sliding, one of the pressure unit claws is anchored at a fixed point to the backing strip 16 of the blade unit by releasable detent means which holds the blade unit and pressure unit assembled but still permits the blade unit to be detached when desired for purposes of replacement. Any one of the several claws 13 of the pressure unit may be used for such anchoring purposes by providing the releasable detent means at an appropriate point along the length of the backing strip.

Various different, selectively usable types of detent means are disclosed, one of these being the spring detent type shown, for example, in FIGS. 6–11, 13 and 15–19. Here the longitudinal edge portions of the backing strip are formed with transversely aligned pairs of longitudinally spaced, substantially L-shaped slits 19 which are open at the edges of the strip and define two pairs of spring detents 20. These spring detents are angularly offset as is best shown in FIGS. 15–17 so as to project outside the cross-section of the backing strip in a direction normal to the strip surfaces, and the longitudinal spacing between the spring detents is substantially the same or slightly larger than the longitudinal dimension of the pressure unit claw 13 which is to be accommodated between the spring detents, as will be apparent from FIG. 17. When the blade unit is applied to the pressure unit, the claws 13 of the pressure unit are slid along the longitudinal edge portions of the backing strip until a selected one of the claws encounters a first pair of transversely aligned spring detents. The detents 20 have resilient characteristics which enable them to retract within the cross-section of the backing strip as the claw passes over them, whereupon they spring back to their normal, projected position and the claw is then retained in a seated or anchored position on portions of the backing strip between the two pairs of spring detents. Thus the blade unit is held assembled to the pressure unit and when the blade unit is to be replaced, a pair of the spring detents 20 are retracted to permit sliding of the claw outwardly from between the two pairs of detents and subsequent sliding separation of the blade unit from the pressure unit.

A slightly modified arrangement of the same type of spring detents is shown in FIG. 20, wherein the detents 20', rather than being offset in a plane normal to the backing strip surfaces, are offset laterally or edgewise in the plane of the strip surfaces, but otherwise the action of the detents is the same as already described. In this figure the claw 13 is shown in locked position between the two sets of inclined spring fingers 20',20'. To remove the claw the spring fingers are depressed as described above.

A second type of releasable or snap-fitting detent means is shown, for example, in FIGS. 10, 12, 22 and 23. The same comprises transversely aligned, longitudinally spaced, concavo-convex bosses 21 which are formed at or closely adjacent to the longitudinal edges of the backing strip and project from one of the strip surfaces, as illustrated.

The longitudinal spacing of the detents 21 is substantially the same or slightly larger than the longitudinal dimension of the pressure unit claw 13 which is to be seated between the detents in a manner similar to the seating of the claw between the aforementioned detents 20 or 20'. However, the boss type detents 21 are not resilient in the same manner as the detents 20 or 20', and thus the detents 21 are carefully proportioned in size and shape so that upon application of sliding pressure the claw may be forced over the detents which exert a cam action, either into a seated position between the detents when the blade unit is being installed, or out of its seated position when the blade unit is being removed. In any event, as in the instance of the spring detents 20 or 20', the claw is passed into its seated position with a releasable or snap-fitting action which holds the parts assembled until they are manually separated, which is facilitated by the rounded configuration of the bosses 21.

The releasable detent means 20, 20' or 21 may be provided in transversely aligned relation on both longitudinal edge portions of the backing strip, or such means may be provided on one longitudinal edge portion only, if so preferred.

A second type of blade unit which may be employed in accordance with the invention is shown in FIGS. 4 and 5. Here the wiper element 14a has a body portion 22, a crown portion 23 and a cross-sectionally reduced neck portion 24, and the backing strip 16a (FIG. 7) is provided with a longitudinal row of openings or slots 25 having the neck portion 24 of the wiper element extending therethrough. In manufacture, the wiper element 14a may be extruded in a conventional manner while the backing strip 16a is being fed through the extruder, so that the two components become unitized by bonding of the crown portion 23 and of the neck portion 24 to the backing strip. The openings 25 not only serve to accommodate the neck portion 24, but also enhance the resilient flexibility of the backing strip as already explained in connection with the slots 18.

The backing strip 16a of the blade unit in FIGS. 4, 5 and 7 may be provided with either the spring type detent means 20, 20' or the boss type snap-fitting detent means 21, as already mentioned.

Another type of blade assembly or unit of the invention is similar to the second type in that it also utilizes the wiper element 14a, but in this instance the wiper element is extruded by itself and is then installed in a separate backing strip of which several modifications are disclosed, as for example in FIGS. 11, 12, 13 and 14. The assembly is illustrated in FIGS. 15, 16, 17, 18, 19, 20 and 22.

The backing strip 26 of FIG. 11 is the preferred embodiment, the same including a pair of transversely spaced strip members 27 and a pair of closed end portions 28 which bridge the strip members together. The neck portion 24 of the wiper element 14a is received in the space 29 between the two strip members 27 and the end portions 28, disposed adjacent the ends of the wiper element 14a, prevent longitudinal sliding of the wiper element relative to the backing strip. Here again, the strip members 27 may be formed with openings 18 to enhance flexibility, and either the detent means 20, 20' or the detent means 21 may be provided on the strip members, as desired, as exemplified in FIGS. 11 and 12, respectively.

The backing strip 26 is preferably formed from a single, strip-like piece of material shown in its developed form in FIG. 24. Such a piece of material is then formed by bending in the region of the lines 30 to provide the end portions 28 when the backing strip assumes its closed configuration with the transversely spaced strip members 27, and manufacture of the strip in this manner eliminates material waste such as would otherwise be involved if the space 29 were blanked out of a wider strip of material. It is to be particularly noted that when the terminal ends 31 of the material strip in FIG. 24 are brought together as in FIG. 11, they are left in an unattached, opposing relation, that is, without being secured together. This not only permits the strip portions 27 to be spread apart for purposes of insertion or removal of the wiper element 14a, but it also permits a certain amount of twisting of the wiper element at one side without transferring the load to the opposite side of the blade unit. The two free ends 31 are preferably cut at an angle which is oblique to the longitudinal axis, so that the ends may lie in abutting relationship without any overlap and assist each other in maintaining longitudinal alignment. It will be understood that the two strip members 27 are prevented from undue spreading laterally away from the neck portion 24 of the wiper element 14a by the embracing engagement of the pressure unit claws 13 therewith.

In forming the L-shape spring detents 20 the following operations may be performed:

1. The flexer rail or backing strip 26 consisting of a piece of stainless steel is placed in a die which first pierces a rectangular hole approximately 0.028 inches in width and 0.187 inches in length, through the flexer rail or strip and close the outside edge of the longitudinal strip leaving approximately 0.030 inches of stock between the hole and the edge of the strip.

2. The next operation pierces the slot approximately 0.028 inches wide perpendicular to the first hole pierced and through the longitudinal edge strip; this removes the L portion from the rail, and the final operation angularly offsets the projections laterally approximately 0.030 inches beyond the edge of the longitudinal strip.

It will be understood that in FIG. 11 the detents 20 are shown before they are angularly offset and in FIGS. 15, 16 and 17 they are shown after the offsetting or bending operation. The detents may be formed either before or after the strip 26 has been bent to the form shown in FIG. 11.

FIG. 13 shows a modified backing strip 26a which may be used in place of the strip 26. In this instance the two strip members 27a are formed separately and include curved end portions 28a which are overlapped and suitably secured together, as by spot welding, for example, to form the closed ends of the backing strip. In another modification shown in FIG. 14, the overlapped strip member end portions 28a are secured together by a rivet 32.

A further embodiment of the invention is shown in FIG. 25 wherein spaced cam type detents 120,120 are employed in connection with a backing strip 126 similar to the backing strip 26 of FIG. 11, said strip comprising spaced longitudinal strip members 127 formed by bending from a single strip of metal and having a pair of closed end portions 128 which bridge the strips together. The terminal ends 131 are interfitted with a L-shaped or stepped connection 132.

The cam detents 120,120 are generally similar in function and operation to the detents 20,20' and 21 previously described in that they permit a claw 13 of the pressure unit to pass over one of said detents and enter the space between the detents where the claw is sustained in releasable locked position, from which locked position the claw may be removed by reverse action of the claw relative to the detents.

As shown in FIG. 25 the detents 120,120 are arranged in oppositely spaced pairs near one end of the backing strip, though only one longitudinally spaced pair is required. Each pair of cams 120 includes oppositely inclined leading cam edges 121 and 121' respectively sloping outwardly from the adjacent longitudinal edge portion 122 of the backing strip to permit entry of the claw 13 from either direction into the space 123 between the detents 120.

Each pair of cam detents also includes steeply inclined cam portions 124 and 124' sloping away from the edge portion 122' within the space 123 to permit removal of the claw 13 from the locked position in either direction.

The pairs of detents 120,120 are preferably formed integral with the edge portions 122 of the backing strip in any suitable manner. Specifically the backing strip or flexer is placed in a die and as the metal is compressed it is forced downwardly and outwardly. On continued application of pressure the cam becomes progressively thinner at its outer portion as the lateral distance from the strip is increased.

The shape of the cam detents 120 is important. When the flexer assembly or blade unit including the backing member or flexer strip carrying the detents is positioned in the superstructure or pressure unit 11 (FIG. 1), the claw 13 of the superstructure acts as a cam follower. The leading edges of the cams angles are low to permit ease of installation; and as the claw approaches the lobe the pressure is increased and as the claw passes the lobe the pressure is decreased placing the assembly in the cam seat 123 or the locked position as shown in FIG. 26. The reverse action removes the claw from the locked position allowing the assembly to be removed from the superstructure.

As shown in FIG. 25 the pairs of cam detents 120,120 are located adjacent one end of the backing strip. FIG. 28 is similar except that the pairs of detents 120' are located further away from the terminal end portions 131 than in FIG. 25.

It will be understood that the preferred form of backing strip as shown for example in FIGS. 11, 12, 25 and 28 is formed from a single strip-like piece of material, preferably spring metal, which is bent intermediate its ends to form a pair of strip members which are integrally connected at one end and loosely fitting at their other ends. The locking detents which may be of the form shown for example in FIGS. 11, 12, 25 and 28 may be formed either before or after bending the backing strip and also the loose end portions may be shaped at any suitable stage. This operation has been generally described in connection with FIGS. 11, 12, 24 and 25 and will be more fully described in reference to FIGS. 31-35 inclusive, wherein various steps in connection with the formation of such backing strip will be set forth.

Figure 32:
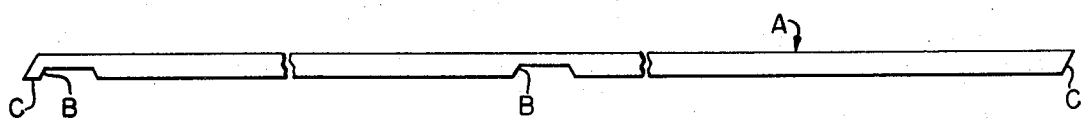
Figure 33:
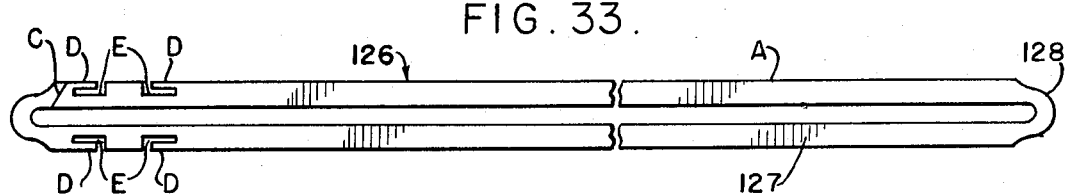
Figure 34:
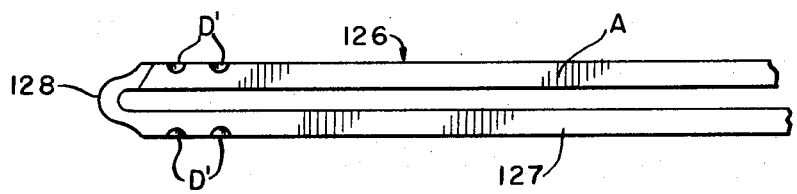
Figure 35:
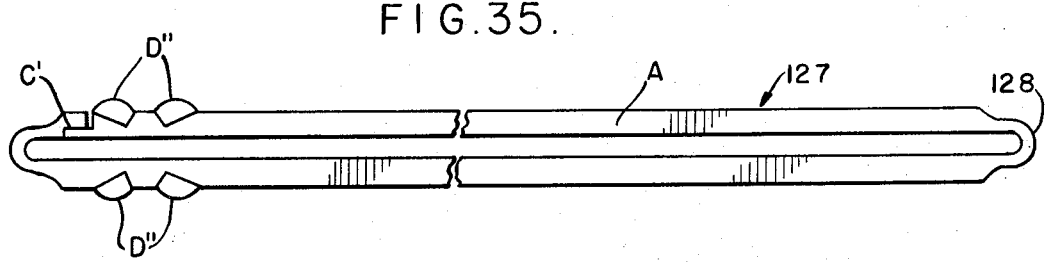

In FIG. 31 a single elongated strip of flexible spring metal is designated by the letter A. In FIG. 32 the strip A is shown as cut away at B and angulary shaped at its ends C prior to the bending operation illustrated in FIG. 33. Either before or after bending pairs of detents D are formed for coaction with the claws 13 of the superstructure as previously described herein. In FIG. 33 the detents are the type shown at 20 in FIG. 11 and are formed by first cutting out an L-shaped portion E after which the spring detents D may be bent outwardly as previously described and as illustrated for example in FIGS. 15 and 20. In FIG. 34 the pairs of detents D',D' are of the concavo-convex boss type shown for example in FIG. 12. In FIG. 35 the pairs of detents D'',D'' are of the cam type shown in FIGS. 25 and 28 and the free end portions C' are shown as provided with a step fit as in FIGS. 25 and 28. As previously indicated the various types of detents may be formed at any stage of the operation, either before or after the strip A (FIG. 31) has been bent to the form shown in FIG. 33 and the detents may be of any suitable form as herein illustrated.

Figure 36:
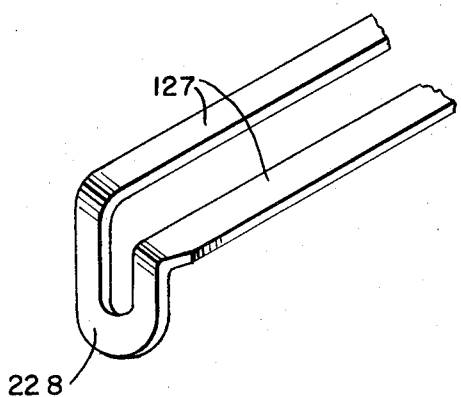
FIG. 36 is a fragmentary perspective view showing one end of a backing strip downturned to provide a wiper element stop.
Figure 37:
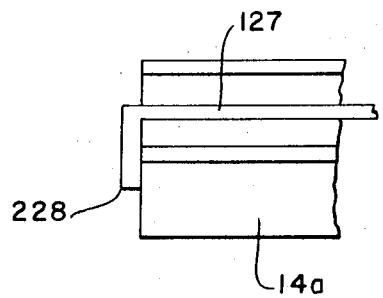
FIG. 37 is a fragmentary elevational view showing the backing strip of FIG. 36 assembled on a wiper element.

FIG. 36 illustrates a modified arrangement of the flexible blade backing strip, which for all practical purposes may be any one of the types shown in FIGS. 11, 12, 25, 28 and 31–35 in that the two strip members 127 have an end portion 228. In this instance the end portion 228 is downturned at right angles to the plane of the strip members and when the backing strip and a wiper element 14a are assembled as shown in FIG. 37, the downturned end portion 228 abuts the adjacent end of the wiper element and provides a stop to prevent sliding of the wiper element off the ends of the strip members. Preferably, the downturned portion 228 is provided at both ends of the backing strip to prevent sliding of the wiper element relative to the backing strip in either direction. It will be appreciated that the backing strip members 127 may be provided with claw locking means such as the detents in any one of FIGS. 11, 12, 25, 28 and 31–35, as already indicated.

Figure 38:
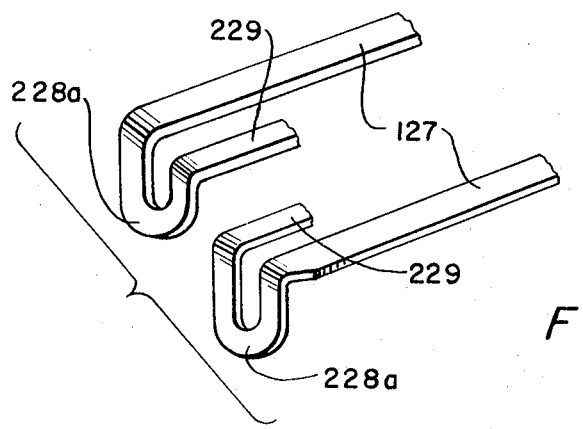
FIG. 38 is a fragmentary group perspective view showing a modified backing strip in which the strip members are overlapped.
Figure 39:
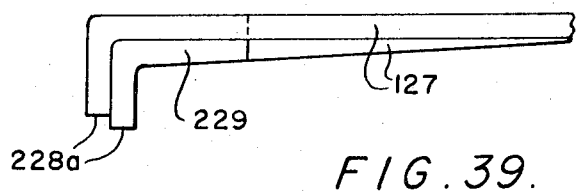
FIG. 39 is a fragmentary side elevational view of the backing strip members of FIG. 38 in their overlapped relation.
Figure 40:
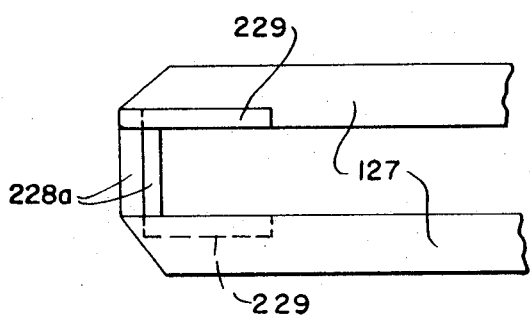
FIG. 40 is a fragmentary plan view of the subject shown in FIG. 39.

FIGS. 38–40 illustrate another modified embodiment of the flexible blade backing strip, in which the free ends of the strip members 127 at one end of the backing strip are overlapped, rather than being brought into an opposing relation as in FIGS. 11, 12, 25, 28 and 31–35. As such, the embodiment of FIGS. 38–40 is somewhat related to those of FIGS. 13–15, but it is arranged differently in that the end portion of each strip member is shaped to provide a semi-circular end 228a terminating in an extension 229. The extension 229 is narrower than the strip member 127 itself, being approximately of the same width as the material of the end 228a.

After the wiper element is inserted between the strip members 127, the strip members are brought together so that the extension 229 of one strip member lies on top of the other strip member and the extension 229 of the other strip member lies below the first strip member, as will be apparent from FIGS. 39 and 40. At the same time, the two ends 228a are nested together, if they are downturned as suggested in FIG. 36 and also shown in FIGS. 38–40, to provide stop means for the wiper element. However, the ends 228a may lie flat in the plane of the respective strip members 127, rather than being downturned, in which event the ends 228a simply overlap each other. In either event, the narrow extensions 229 are located at the inner edges of the relatively wide strip members 127, as will be apparent from FIG. 40. Any of the clawlocking detents of FIGS. 11, 12, 24, 25 and 31–35 may be provided on the strip members 127 in the embodiment of FIGS. 38–40.

FIGS. 41 and 42 show another modified embodiment of the flexible blade backing strip in which the free ends of the strip members 127 are also overlapped and in addition, the claw locking means are provided on the overlapped end portions rather than on the strip members themselves. In this embodiment each strip member has a substantially semi-circular end 228a terminating in an extension 230 which is of approximately the same width as the strip member itself, although the material of the end 228a is narrower so that a cam-edged step 231 exists at the junction of the end 228a with the extension 230. The terminal end of the extension 230 is also cam-edged as indicated at 232.

The curvature of the end 228a is somewhat less than 180°, so that when a wiper element is inserted between the two strip members 127 and the free end portions of the strip members are brought together in overlapping relation as shown in FIG. 42, the extension 230 of each strip member projects angularly beyond the outer side edge of the other strip member. The claw locking means consist of a notch 233 cut into the outer edge of each extension 230, which notch forms a seat for the claw such as the claw 13 in FIG. 1.

The ends 228a of the strip members 127 are resiliently flexible so that although the extensions 230 are normally outwardly projected beyond the strip members as shown in FIG. 42, these extensions may be pressed inwardly as indicated by the arrows 234 when the claw is to be seated in or unseated from the notches 233. Thus, assuming a wiper element and the backing strip as having been assembled, the claw may be passed longitudinally over the end of the assembly as indicated by the arrow 235. In the direction of the arrow 235 the extensions 230 have a mutually divergent relationship, and as the claw passes over the steps 231 and comes into engagement with the divergent outer edges of the extensions 230, these extensions will be pressed inwardly in the direction of the arrows 234 until the claw snaps into the notches 233 and becomes seated therein. If the claw is applied to the assembly in a direction opposite to that of the arrow 235, that is, in a direction from the opposite end of the backing strip, the extensions 230 may be manually pressed inwardly as at 234 and the cam edges 232 will assist in passing the claw over the extensions until it is seated in the notches 233. The claw may be removed from the backing strip in either direction by manually pressing the extensions 230 inwardly to facilitate unseating of the claw from the notches 233.

It may be noted that although each of the notches 233 has been referred to as providing a seat for the claw, it may also be regarded in terms of two longitudinally spaced detents for seating of the claw therebetween, if the longitudinally opposed edge portions of each notch are regarded as constituting individual detents. In this context the notch arrangement of FIGS. 41–42, and also of FIGS. 43–44 hereinafter described, is comparable to the pairs of longitudinally spaced detents such as those in FIGS. 11, 12, 24, 25, 28 and 31–35.

It may also be noted that although the ends 228a in FIGS. 41–42 are shown as being flat and coplanar with the respective strip members 127, these ends may be downturned to provide stops for the wiper element, as for example in FIGS. 36–40. The same is also applicable to the hereinafter described embodiment of FIGS. 43–44.

The flexible blade backing strip embodiment of FIGS. 43–44 is related to the embodiments of FIGS. 37 and 38 in that one of the strip members 127x is provided with an end 228a and an extension 230 as in FIG. 43, while the other strip member 127y has a semi-circular end 228a and extension 229, similar to FIG. 38. The end 228a and extension 229 are relatively narrow in comparison to the width of the strip 127y, and the portion of the strip adjacent the end 228a is recessed or cut away as at 236, so that it is of substantially the same narrow width as the end 228a and extension 229.

When a wiper element is inserted between the strip members 127x and 127y and the ends of the strip members are brought together into overlapping relationship as shown in FIG. 44, the extension 229 of the strip member 127y lies at the inner edge of the strip member 127x, while the narrow, recessed portion 236 of the strip member 127y lies adjacent the inner edge of the extension 230 of the strip member 127x, with sufficient clearance between the recessed portion 236 and the inner edge of the notch 233 to permit the extension 230 to move inwardly in the direction of the arrow 234 when a claw passes over the extension 230 for seating in the notch 233.

The embodiment of FIGS. 43–44 is comparable to that of FIGS. 41–42 in that the notched extension 230 constitutes the claw locking means which in FIGS. 41–43 are duplicated at both sides of the backing strip, but in FIG. 43–44 are at one side only.

It is to be particularly noted that in all the embodiments of FIGS. 36–44 where the strip members are equipped with the ends 228 or 228a and with the extensions 229 or 230, the ends 228 or 228a extend around the adjacent end of the wiper element and each strip member with its extension 229 or 230 engages the opposite sides of the neck of the wiper element to securely hold it in place.

While in the foregoing there have been described and shown various embodiments of the invention, other modifications may become apparent to those skilled in the art to which the invention relates. Accordingly, it is not desired to limit the invention to this disclosure and various modifications and equivalents may be resorted to, falling within the spirit and scope of the invention as claimed.

What is claimed is:

1. A method of forming a backing strip for a windshield wiper blade from a single thin flat strip of metal which is resiliently flexible in a plane normal to its flat surfaces and is substantially rigid against edgewise movement, which method comprises forming a bending portion intermediate the ends of the strip, bending the strip in the plane of its flat surfaces to provide a pair of spaced strip members connected at the bending portion of the original strip but unconnected at the opposite end and bending the unconnected end portion of each strip member to form a closed end thereon and an extension of said closed end so that said extension may overlap the unconnected end portion of the other strip member.

2. A method according to claim 1 wherein said closed end is formed by removing an edge portion of the original strip.

3. A method according to claim 1 together with the additional step of forming a notch in said extension of at least one of said strip members to provide a detent therein.

4. A method according to claim 3 which is further characterized in that the step of bending the unconnected end portion of at least one of said strip members to form said closed end thereon enables said closed end to resiliently and retractably bias the notched extension to a laterally projected position beyond the other strap member.

5. A method according to claim 1 together with the additional step of bending down the closed ends of the strip members to provide stop means for a wiper element when assembled thereon.

* * * * *